United States Patent

[11] 3,602,953

| [72] | Inventor | Carl Thomas |
| | | Hamburg, Germany |
| [21] | Appl. No. | 827,722 |
| [22] | Filed | May 26, 1969 |
| [45] | Patented | Sept. 7, 1971 |
| [73] | Assignee | Jurid Werke GmbH |
| | | Glinde near Hamburg, Germany |
| [32] | Priority | May 29, 1968 |
| [33] | | Germany |
| [31] | | P 17 50 722.1 |

[54] WIRE HOSE CLIP
8 Claims, 15 Drawing Figs.

[52] U.S. Cl. .................................................. 24/20 TT, 24/256
[51] Int. Cl. ...................................................... B65d 63/10
[50] Field of Search ............................................ 24/20 R, 255 SL, 271, 19, 277, 274, 27, 20 TT, 256, 27, 257; 128/337, 325

[56] References Cited
UNITED STATES PATENTS

| 210,560 | 12/1878 | Robertshaw | 24/20 R |
| 1,441,154 | 1/1923 | Johnson | 24/20 R |
| 1,379,476 | 5/1921 | Parr | 24/256 UX |
| 2,461,234 | 2/1949 | Radtke | 24/274 |
| 2,472,172 | 6/1949 | Ovens et al. | 24/257 |
| 2,881,762 | 4/1959 | Lowrie | 128/337 |

*Primary Examiner*—Donald A. Griffin
*Attorney*—Young & Thompson

ABSTRACT: A wire hose clip comprising an open-ended ring of wire the ends of the wire overlapping and being provided with mutually engageable teeth which are formed on facing planar surfaces which lie normal to the plane of the ring, or which are provided on the total surface of each end of the wire. A safety sleeve may be provided for resiliently gripping round the interengaged ends of the wire and points of engagement for a tool for tightening the clip are provided adjacent the teeth. The clip may comprise two parts hinged together at a point in the ring opposite the teeth or a single part with a loop formed in the wire at a point in the ring opposite the teeth.

PATENTED SEP 7 1971　　　　　　　　　　　　3,602,953

INVENTOR
CARL THOMAS
BY
Young + Thompson
ATTYS.

INVENTOR
CARL THOMAS

PATENTED SEP 7 1971 3,602,953

INVENTOR
CARL THOMAS
BY
Young + Thompson
ATTYS.

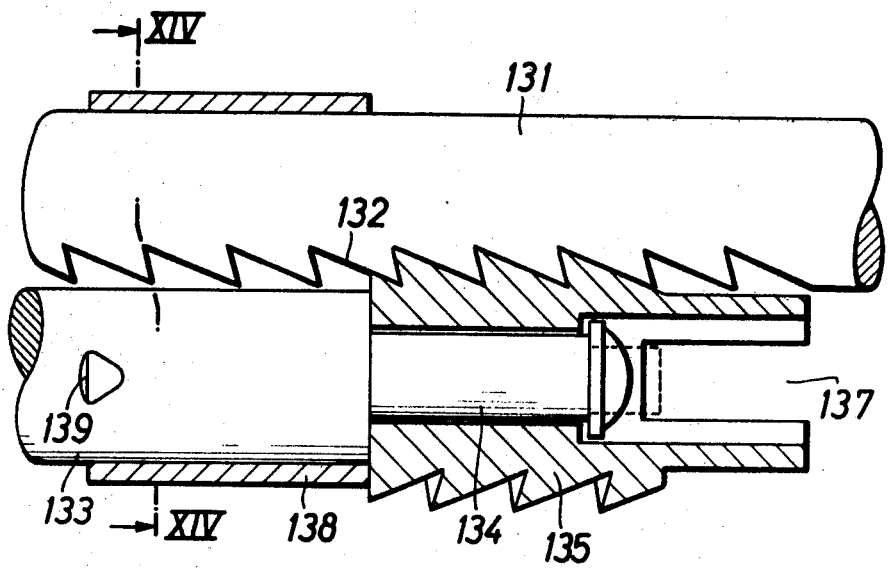
FIG. 13
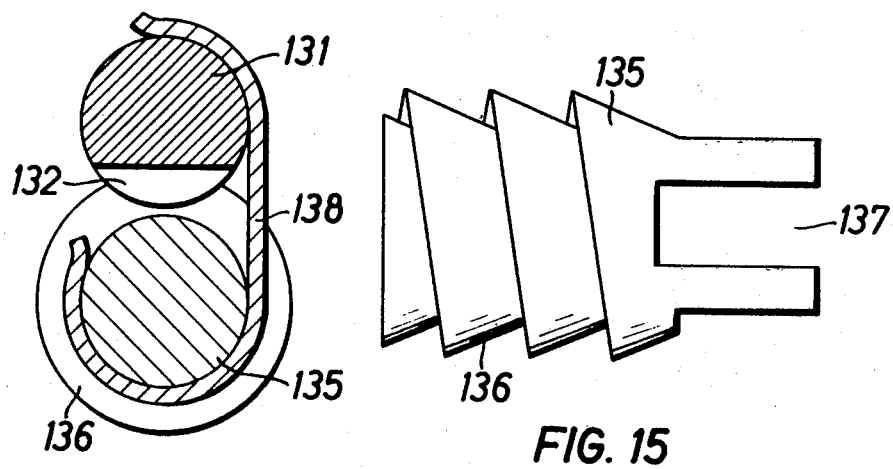
FIG. 14
FIG. 15

WIRE HOSE CLIP

The invention relates to wire hose clips and is concerned with providing a clip for effecting a coupling, as for instance in hose couplings to fix hoses or similar flexible tubing to nozzles or pipe nipples.

The invention comprehends among other features, a wire hose clip formed as a single unit and made of steel wire, providing an open-ended ring adapted to encircle hoses or other members of various diameters after which the ends of the ring-shaped wire are forced into overlapping and single locking engagement against the springlike action of the material from which the wire is made.

This wire hose clip of the invention is particularly useful for quick and easy fixing hoses to nozzles whereby the disadvantages of known hose clips are avoided; the inventive wire hose clip is simple to manufacture, can be reused, has no protruding parts which take up unnecessary space and are liable to cause injury and it can be easily fitted and retightened with simple tools.

It is an object of the present invention to provide a wire hose clip which can be made on automatic machines from steel wire, for example from steel with a permissible tensile strength of 50 kg./mm.$^2$, this material having a sufficient elasticity without being too brittle.

A further object of the present invention is to provide a one-piece radially opening ring-shaped hose clip having a plurality of teeth formed on facing planar surfaces which lie normal to the plane of the ring.

Another object is to provide a hose clip comprising an open-ended ring of wire being of particular advantage since it can be made of steel wire, the total surface of each end of the wire being provided with teeth which can be produced by rolling or grinding.

Yet another object is to provide a wire hose clip, the ends of which are bent out of the plane of the ring. This results in a particularly reliable interengagement of the teeth.

A further object is a ring-shaped wire hose clip in which the bases of the teeth lie on radii of the ring and which is particularly satisfactory as a result of its favorable action on the surface of the hose.

Yet another object of the invention is to provide a wire hose clip being provided with teeth which have an undercut sawtooth profile whereby the bases of the teeth on one end of the wire are opposite to the bases of the teeth on the other end. Not only does this tooth profile only require small forces for tightening, because the teeth surfaces slide easily over each other, but also affords the greatest possible strength of the tooth construction.

Yet another object is to provide a wire hose clip in which the interengaging teeth are surrounded with a bridge-shaped safety element in the form of a split sleeve. This safety casing resiliently grips the ends of the wire and does not need to be removed when tightening the clip.

A further object is a clip of this type which is provided in the vicinities of the rows of teeth located at the ends of the wire with means for easy tightening of the clip, preferably with engagement points for a tool, for example, a pair of gland pliers. The support surfaces with which the tool engages are preferably inclined to the axis of the wire in the direction of the teeth, whereby tightening is considerably facilitated.

It is a further and particularly advantageous object of the present invention to provide a hose clip comprising an open-ended ring of wire and being provided with mutually engageable teeth and wherein a row of teeth is provided at one end and, at the other end, a toothed portion rotatable about the axis of the wire and having a screw-shaped tooth construction is provided. Such a clip is more difficult to manufacture than the embodiment described above, but it has the advantage of being steplessly adjustable.

A further object of the invention is to provide a clip suitable for special cases, the clip comprises two portions hinged at a point opposite the toothed ends or a loop is formed in the wire at this point. Such hinged clips can be fitted around the hose as distinct from being slid over the ends of the hose, which is often very desiraBle, particularly in making repairs. Clips having a loop at a point opposite the toothed ends have the advantage of an increased elasticity, which facilitates the tightening of the clip and compensates for the small alterations in the diameter or too small an elasticity of the object to be clamped.

Further and other objects will appear from the following description in which reference is to be had to the accompanying drawings, constituting a part of this specification, in which similar characters of reference denote corresponding parts in all the views, and in which:

FIG. 13 is a partial cross-sectional view of another embodiment with a rotatable toothed part;

FIG. 14 is a cross-sectional view taken along the line XIV—XIV of FIG. 13; and

FIG. 15 shows the toothed part of the clip according to FIG. 13.

FIGS. 1, 2, and 3 and 5 illustrate a very simple embodiment of a wire clip 1 according to the invention. The cross section of the wire can be round, oval or square and the wire can be solid or hollow.

The parallel ends of the wire are provided with a row of teeth 21 on one end and a row of teeth 22 on the other. The teeth are formed on planes of the wire lying normal to the plane of the hose.

Notches 11 and 12 for engagement of the tightened tool such as a pair of pliers 3 are located near the rows of teeth 21 and 22.

Figure 1:
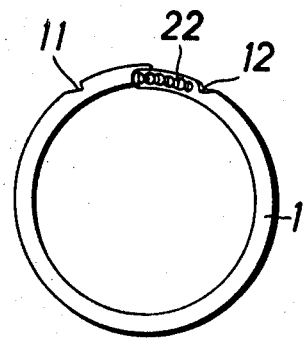
FIG. 1 is a plan view of a wire clip according to the invention, in the untightened position.
Figure 3:
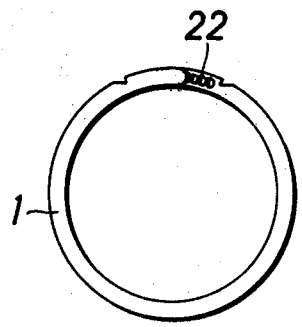
FIG. 3 shows the clip of FIG. 1 in the tightened position with the teeth in interengagement.
Figure 2:
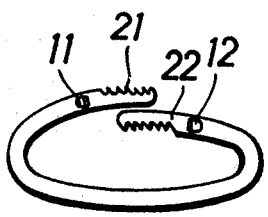
FIG. 2 is a perspective side view of the clip according to FIG. 1.
Figure 4:
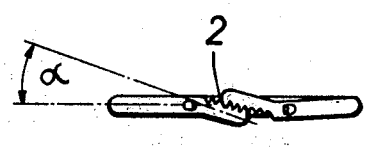
FIG. 4 is a side view of another embodiment of a clip with a rounded-off tooth-construction.
Figure 5:
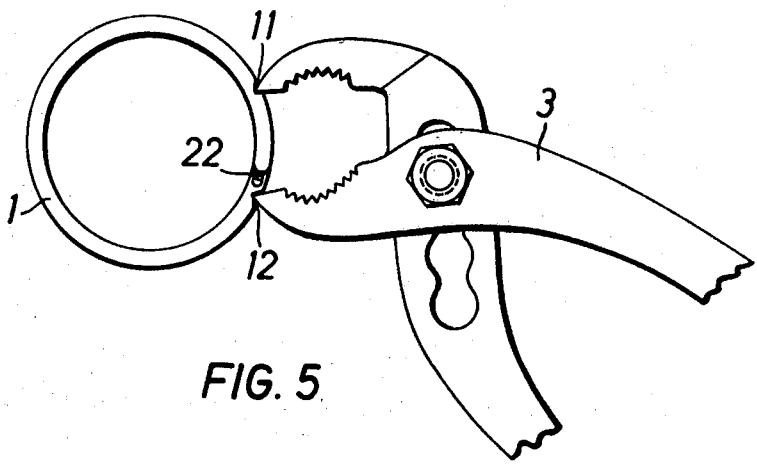
FIG. 5 shows the clip of FIG. 3 being tightened by gland nut pliers.

FIG. 4 shows an embodiment wherein the teeth 21 and 22 form an angle with the axis of the wire. Conventional pliers are able to tighten the clip, but gland nut pliers as shown in FIG. 5 are more suitable.

Figure 6:
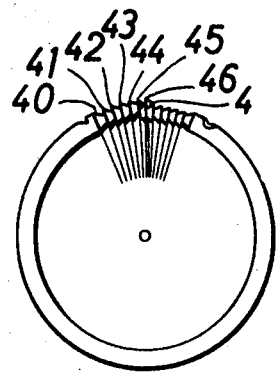
FIG. 6 is a plan view of another embodiment of a clip with a circular tooth profile, in the untightened position.
Figure 8:
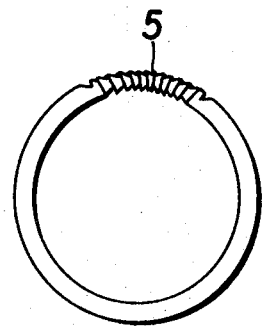
FIG. 8 is a plan view of a clip with a helical tooth-construction in the tightened position.
Figure 7:
FIG. 7 is a perspective side view of the clip according to FIG. 6.
Figure 9:
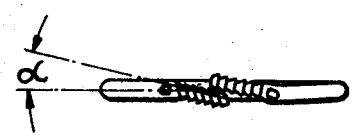
FIG. 9 is a side view of a clip with a helical rounded tooth-construction in the tightened position.

FIGS. 6 and 7 show embodiments of the wire clip with a circular tooth profile 4 and FIGS. 8 and 9 show a clip having a helical tooth profile 5. The teeth 4 in FIGS. 6 and 7 are so aligned that the parts of the tooth profile indicated by 40 to 46 lie on radii of the circle formed by the clip.

FIG. 9 illustrates the formation of a helical tooth profile with the teeth forming an angle $\alpha$ with the axis of the wire.

Figure 10:
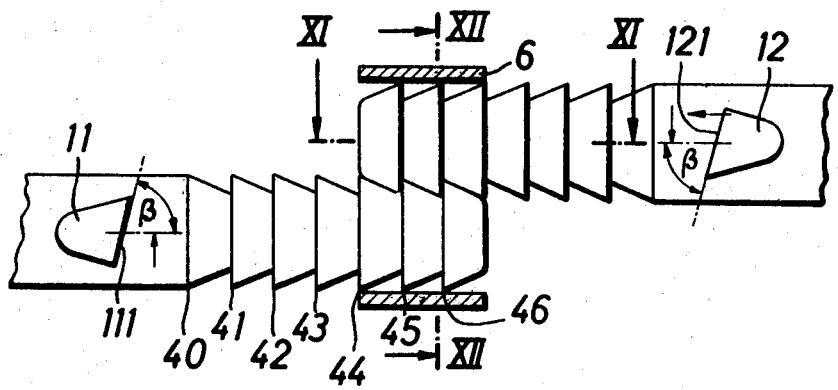
FIG. 10 is a partial cross-sectional view of a clip on an enlarged scale, showing the tooth-construction.

FIG. 10 can be regarded as an enlarged view of FIG. 6.

Support surfaces 111 and 121 for the tightening tool 3 are provided at the points of engagement 11 and 12.

These surfaces form an angle $\beta$ with the wire axis so that the ends of the wire become somewhat compressed with the rows of teeth during tightening, with the result that the teeth do not slip out of mesh.

Figure 11:
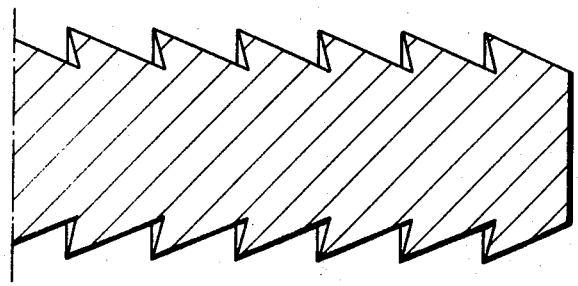
FIG. 11 is a cross-sectional view taken along the line XI—XI of FIG. 10.

FIGS. 10 and 11 moreover show the undercut sawtooth profile and it can be seen that the sawteeth intermesh, the bases of the teeth at one end of the wire, for example 45 or 46, opposing the bases of the teeth at the other end.

Figure 12:
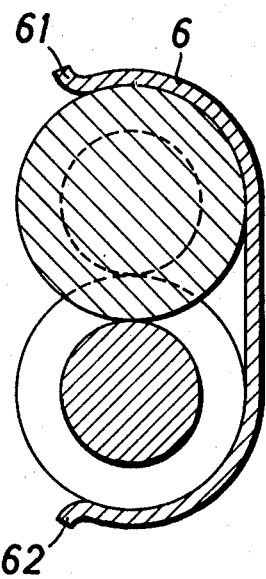
FIG. 12 is a cross-sectional view taken along the line XII—XII of FIG. 10.

FIGS. 10 and 12 show how a resilient safety element 6 overlaps the ends of the wire at the meshing position in the form of an elastic bridge. The overlapping edges 61 and 62 of the sleeve 6 are bent outwards, as shown in FIG. 12, to facilitate slipping the safety element over the teeth.

The embodiment illustrated in FIG. 13 enables the wire clip to be continuously tightened as distinct from the steplike tightening of the previous embodiments. This figure shows one end 131 of the wire with a row of teeth 132 and the other end 133 of the wire with a helical-toothed part 135 on a boltlike constriction 134 which serves as the axis. The toothed part 135 can, as indicated, for example, be connected with the end 133 of the wire by simply upsetting the constriction 134. In order that the clip can be tightened, a socket 137 for engagement of a tool is located on the toothed part 135. With the embodiment according to FIG. 13, a sleeve or other safety element 138 is preferably fitted which engages round the ends of the wire 132, 133 as shown in FIG. 14. Thereby, the radius of curvature of the part of the safety element which surrounds the end 133 of the wire can be selected so as to be larger than that surrounding the end 131 of the wire or than that of the safety element 6 according to FIG. 12. The safety element 138 directly abuts the end 133 of the wire so that it is supported at the toothed part 135 and at a pip 139 on the end 133 of the wire.

With the wire hose clip of the present invention, the disadvantages of the known hose clips are avoided. The use of wire improves the clip of the present invention over the art, i.e., the use of a band that, when tightening the clip, higher specific pressures arise which are advantageous for sealing.

I claim:

1. A hose clip, comprising an open-ended ring of wire, the ends of the wire overlapping and being provided with mutually engageable teeth, the teeth having an undercut sawtooth profile, the bases of the teeth on one end of the wire being oppositely directed to the bases of the teeth on the other end of the wire, the bases of the teeth lying on the radius of the ring.

2. A hose clip, comprising an open-ended ring of wire, the ends of the wire overlapping and being provided with mutually engageable teeth in the form of a screw.

3. A hose clip, comprising an open-ended ring of wire, the ends of the wire overlapping and being provided with mutually engageable teeth, and a safety sleeve resiliently gripping around the interengaged ends of the wire.

4. A hose clip, comprising an open-ended ring of wire, the ends of the wire overlapping and being provided with mutually engageable teeth, there being points of engagement for a tool for tightening the clip, said points of engagement being on the wire adjacent the teeth and having support surfaces for the tightening tool which are inclined to the axis of the wire in the direction of the teeth.

5. A hose clip, comprising an open-ended ring of wire, the ends of the wire overlapping and being provided with mutually engageable teeth, one end of the wire having a fixed row of teeth and the other end of the wire having helical teeth on its total surface, said helical teeth being rotatable about the axis of the wire.

6. A clip according to claim 5, wherein a resilient safety element grips round the two interlocking ends of the wire and is supported on a pip attached to the rotatable end.

7. A hose clip, comprising an open-ended ring of wire, the ends of the wire overlapping and being deflected out of the plane of the ring but not out of the radius of the ring, and mutually engageable teeth on said deflected ends of the wire.

8. A hose clip, comprising an open-ended ring of wire, the ends of the wire overlapping and terminating in rounded ends each of which overlies the opposite end portion of the wire, and mutually engageable teeth on said overlapping ends.